United States Patent
Shi et al.

(10) Patent No.: US 11,753,817 B2
(45) Date of Patent: Sep. 12, 2023

(54) PLASTER BOARDS AND METHODS FOR MAKING THEM

(71) Applicant: CertainTeed Gypsum, Inc., Malvern, PA (US)

(72) Inventors: Zhiqiang Shi, Shrewsbury, MA (US); Aldo Glean, Framingham, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 815 days.

(21) Appl. No.: 15/844,088

(22) Filed: Dec. 15, 2017

(65) Prior Publication Data

US 2018/0171626 A1    Jun. 21, 2018

Related U.S. Application Data

(60) Provisional application No. 62/434,984, filed on Dec. 15, 2016.

(51) Int. Cl.
*E04B 1/86* (2006.01)
*B32B 27/30* (2006.01)
(Continued)

(52) U.S. Cl.
CPC ............ *E04B 1/86* (2013.01); *B28B 19/0092* (2013.01); *B32B 5/022* (2013.01); *B32B 5/024* (2013.01);
(Continued)

(58) Field of Classification Search
CPC .. E04B 1/86; E04B 1/8209; E04B 2001/8461; B32B 27/308; B32B 5/022;
(Continued)

(56) References Cited

U.S. PATENT DOCUMENTS 2,806,811 A    9/1957  Hazmburg
2,811,906 A   11/1957  Chappell
(Continued)

FOREIGN PATENT DOCUMENTS

CA    2 479 147 A1    2/2003
CN       2344468      10/1999
(Continued)

OTHER PUBLICATIONS

International Search Report issued in co-pending International Patent Application No. PCT/US2017/066780, European Patent Office, dated Mar. 21, 2018, 5 pages.
(Continued)

*Primary Examiner* — Francisco W Tschen
*Assistant Examiner* — Abhishek A Patwardhan
(74) *Attorney, Agent, or Firm* — McDonnell Boehnen Hulbert & Berghoff LLP

(57) ABSTRACT

The present disclosure relates to plaster boards and methods for making them. For example, one aspect of the disclosure is a plaster board comprising one or more continuous layers of material disposed within a body of hardened plaster material, the first side and second side of each continuous layer of material being substantially covered by the hardened plaster material. In certain such embodiments, each continuous layer of material includes a polymer (e.g., a damping polymer) disposed on a carrier sheet. Another aspect of the disclosure relates to a method for making a plaster board that involves drying a wet body of plaster material while a continuous layer of material or precursor therefor is disposed within it.

20 Claims, 10 Drawing Sheets

(51) Int. Cl.
| | |
|---|---|
| *B32B 5/02* | (2006.01) |
| *B32B 13/08* | (2006.01) |
| *B32B 29/00* | (2006.01) |
| *B32B 5/26* | (2006.01) |
| *B32B 13/02* | (2006.01) |
| *C04B 28/02* | (2006.01) |
| *B32B 13/04* | (2006.01) |
| *B32B 27/28* | (2006.01) |
| *C04B 28/14* | (2006.01) |
| *C04B 28/10* | (2006.01) |
| *B32B 29/02* | (2006.01) |
| *B32B 5/20* | (2006.01) |
| *B28B 19/00* | (2006.01) |
| *B32B 13/12* | (2006.01) |
| *B32B 13/14* | (2006.01) |
| *E04B 1/82* | (2006.01) |
| *E04C 2/04* | (2006.01) |
| *E04C 2/52* | (2006.01) |
| *G10K 11/168* | (2006.01) |
| *C04B 111/00* | (2006.01) |
| *E04B 1/84* | (2006.01) |

(52) U.S. Cl.
CPC ............ *B32B 5/028* (2013.01); *B32B 5/20* (2013.01); *B32B 5/26* (2013.01); *B32B 13/02* (2013.01); *B32B 13/045* (2013.01); *B32B 13/08* (2013.01); *B32B 13/12* (2013.01); *B32B 13/14* (2013.01); *B32B 27/283* (2013.01); *B32B 27/302* (2013.01); *B32B 27/308* (2013.01); *B32B 29/002* (2013.01); *B32B 29/007* (2013.01); *B32B 29/02* (2013.01); *C04B 28/02* (2013.01); *C04B 28/10* (2013.01); *C04B 28/14* (2013.01); *E04B 1/8209* (2013.01); *E04C 2/043* (2013.01); *E04C 2/526* (2013.01); *G10K 11/168* (2013.01); *B32B 2255/00* (2013.01); *B32B 2255/02* (2013.01); *B32B 2255/12* (2013.01); *B32B 2255/26* (2013.01); *B32B 2260/02* (2013.01); *B32B 2260/021* (2013.01); *B32B 2260/023* (2013.01); *B32B 2260/028* (2013.01); *B32B 2264/00* (2013.01); *B32B 2264/101* (2013.01); *B32B 2264/12* (2013.01); *B32B 2307/10* (2013.01); *B32B 2307/102* (2013.01); *B32B 2307/732* (2013.01); *B32B 2419/00* (2013.01); *B32B 2607/00* (2013.01); *C04B 2111/0062* (2013.01); *C04B 2111/00629* (2013.01); *E04B 2001/8461* (2013.01)

(58) Field of Classification Search
CPC ....... B32B 13/08; B32B 29/002; B32B 5/024; B32B 5/26; B32B 13/02; B32B 29/007; B32B 13/045; B32B 27/283; B32B 27/302; B32B 5/028; B32B 29/02; B32B 5/20; B32B 13/12; B32B 13/14; B32B 2255/26; B32B 2307/732; B32B 2264/101; B32B 2260/021; B32B 2255/12; B32B 2260/023; B32B 2264/12; B32B 2255/02; B32B 2255/00; B32B 2264/00; B32B 2260/02; B32B 2419/00; B32B 2307/10; B32B 2260/028; B32B 2307/102; B32B 2607/00; B32B 3/10; B32B 5/18; B32B 13/06; B32B 2250/40; B32B 2307/56; B32B 2307/542; B32B 2307/50; B32B 2307/3065; B32B 2262/101; B32B 2419/04; B32B 2307/718; B32B 2260/046; C04B 28/02; C04B 28/14; C04B 28/10; C04B 2111/0062; C04B 2111/00629; B28B 19/0092; E04C 2/043; E04C 2/526; G10K 11/168

See application file for complete search history.

(56) References Cited

U.S. PATENT DOCUMENTS

| | | |
|---|---|---|
| 3,160,549 A | 12/1964 | Caldwell et al. |
| 3,215,225 A | 11/1965 | Kirschner |
| 3,336,710 A | 8/1967 | Raynes |
| 3,399,104 A | 8/1968 | Ball, III et al. |
| 3,424,270 A | 1/1969 | Hailman et al. |
| 3,462,899 A | 8/1969 | Sherman |
| 3,513,009 A | 5/1970 | Austin et al. |
| 3,579,941 A | 5/1971 | Tibbals |
| 3,642,511 A | 2/1972 | Cohn et al. |
| 3,828,504 A | 8/1974 | Egerborg et al. |
| 3,960,580 A | 6/1976 | Stierli et al. |
| 4,003,752 A | 1/1977 | Osohata et al. |
| RE29,157 E | 3/1977 | Petersen et al. |
| 4,045,268 A | 8/1977 | Geschwender |
| 4,112,176 A | 9/1978 | Bailey |
| 4,134,956 A | 1/1979 | Suzuki et al. |
| 4,156,615 A | 5/1979 | Cukier et al. |
| 4,174,229 A | 11/1979 | Boberski et al. |
| 4,265,979 A | 5/1981 | Baehr et al. |
| 4,347,912 A | 9/1982 | Flocke et al. |
| 4,375,516 A | 3/1983 | Barrall |
| 4,378,405 A | 3/1983 | Pilgrim |
| 4,390,642 A | 6/1983 | Smith |
| 4,474,840 A | 10/1984 | Adams |
| 4,487,793 A | 12/1984 | Haines et al. |
| 4,557,970 A | 12/1985 | Holtrop et al. |
| 4,618,370 A | 10/1986 | Green et al. |
| 4,642,951 A | 2/1987 | Mortimer |
| 4,663,224 A | 5/1987 | Tabata et al. |
| 4,678,515 A | 7/1987 | Green et al. |
| 4,685,259 A | 8/1987 | Eberhart et al. |
| 4,759,164 A | 7/1988 | Abendroth et al. |
| 4,778,028 A | 10/1988 | Staley |
| 4,786,543 A | 11/1988 | Ferm |
| 4,924,969 A | 5/1990 | K'Heureux |
| 4,956,321 A | 9/1990 | Barrall |
| 4,967,530 A | 11/1990 | Clunn |
| 5,016,413 A | 5/1991 | Counihan |
| 5,026,593 A | 6/1991 | O'Brien |
| 5,033,247 A | 7/1991 | Clunn |
| 5,060,291 A | 10/1991 | Albertelli |
| 5,063,098 A | 11/1991 | Niwa et al. |
| 5,104,715 A | 4/1992 | Cruz |
| 5,110,660 A | 5/1992 | Wolf et al. |
| 5,125,475 A | 6/1992 | Ducharme et al. |
| 5,158,612 A | 10/1992 | Savoly et al. |
| 5,240,639 A | 8/1993 | Diez et al. |
| 5,256,223 A | 10/1993 | Alberts et al. |
| 5,258,585 A | 11/1993 | Juriga |
| 5,334,806 A | 8/1994 | Avery |
| 5,342,465 A | 8/1994 | Bronowicki et al. |
| 5,368,914 A | 11/1994 | Barrett |
| 5,439,735 A | 8/1995 | Jamison |
| 5,473,122 A | 12/1995 | Kodiyalam et al. |
| 5,502,931 A | 4/1996 | Munir |
| 5,601,888 A | 2/1997 | Fowler |
| 5,603,192 A | 2/1997 | Dickson |
| 5,629,503 A | 5/1997 | Thomasen |
| 5,643,666 A | 7/1997 | Eckart et al. |
| 5,664,397 A | 9/1997 | Holz |
| 5,691,037 A | 11/1997 | McCutcheon et al. |
| 5,695,867 A | 12/1997 | Saitoh et al. |
| 5,768,841 A | 6/1998 | Swartz et al. |
| 5,824,973 A | 10/1998 | Haines et al. |
| 5,867,957 A | 2/1999 | Holtrop |
| 5,910,082 A | 6/1999 | Bender et al. |
| 5,923,002 A | 7/1999 | McGrath et al. |
| 5,945,208 A | 8/1999 | Richards et al. |

(56) References Cited

U.S. PATENT DOCUMENTS

| | | | |
|---|---|---|---|
| 5,954,497 A | 9/1999 | Cloud et al. | |
| 6,077,613 A | 6/2000 | Gaffigan | |
| 6,123,171 A | 9/2000 | McNett et al. | |
| 6,133,172 A | 10/2000 | Sevenish et al. | |
| 6,213,252 B1 | 4/2001 | Ducharme | |
| 6,240,704 B1 | 6/2001 | Porter | |
| 6,266,427 B1 | 7/2001 | Mathur | |
| 6,286,280 B1 | 9/2001 | Fahmy et al. | |
| 6,290,021 B1 | 9/2001 | Standgaard | |
| 6,309,985 B1 | 10/2001 | Virnelson et al. | |
| 6,342,284 B1 | 1/2002 | Yu | |
| 6,381,196 B1 | 4/2002 | Hein et al. | |
| 6,389,771 B1 | 5/2002 | Moller | |
| 6,391,958 B1 | 5/2002 | Luongo | |
| 6,443,256 B1 | 9/2002 | Baig | |
| 6,488,792 B2 | 12/2002 | Mathieu | |
| 6,632,550 B1 | 10/2003 | Yu | |
| 6,676,744 B2 | 1/2004 | Merkley et al. | |
| 6,699,426 B1 | 3/2004 | Burke | |
| 6,715,241 B2 | 4/2004 | Gelin et al. | |
| 6,758,305 B2 | 7/2004 | Gelin et al. | |
| 6,790,520 B1 | 9/2004 | Todd et al. | |
| 6,800,161 B2 | 10/2004 | Takigawa | |
| 6,803,110 B2 | 10/2004 | Drees et al. | |
| 6,815,049 B2 | 11/2004 | Veramasuneni | |
| 6,822,033 B2 | 11/2004 | Yu | |
| 6,825,137 B2 | 11/2004 | Fu et al. | |
| 6,877,585 B2 | 4/2005 | Tinianov | |
| 6,913,667 B2 | 7/2005 | Nudo et al. | |
| 6,920,723 B2 | 7/2005 | Downey | |
| 6,941,720 B2 * | 9/2005 | DeFord | C04B 28/02 52/783.17 |
| 7,041,377 B2 | 5/2006 | Miura et al. | |
| 7,049,251 B2 | 5/2006 | Porter | |
| 7,068,033 B2 | 6/2006 | Sellers et al. | |
| 7,181,891 B2 | 2/2007 | Surace et al. | |
| 7,197,855 B2 | 4/2007 | Della Pepa | |
| 7,255,907 B2 | 8/2007 | Feigin et al. | |
| 7,686,902 B2 | 3/2010 | Kimura et al. | |
| 7,745,005 B2 | 6/2010 | Tinianov | |
| 7,799,410 B2 | 9/2010 | Tinianov | |
| 7,883,763 B2 | 2/2011 | Tinianov | |
| 8,409,391 B2 | 4/2013 | Hauber et al. | |
| 8,424,251 B1 | 4/2013 | Tinianov | |
| 8,486,516 B2 | 7/2013 | Hauber et al. | |
| 9,221,719 B2 | 12/2015 | Stav et al. | |
| 9,259,888 B2 | 2/2016 | Hauber et al. | |
| 9,387,649 B2 | 7/2016 | Tinianov | |
| 2004/0016184 A1 | 1/2004 | Huebsch | |
| 2004/0152379 A1 * | 8/2004 | McLarty, III | B32B 13/02 442/33 |
| 2004/0168853 A1 | 9/2004 | Gunasekera | |
| 2004/0214008 A1 | 10/2004 | Dobrusky | |
| 2005/0066618 A1 | 3/2005 | Tucker | |
| 2005/0103568 A1 | 5/2005 | Sapoval | |
| 2005/0176833 A1 | 8/2005 | Tay | |
| 2005/0263925 A1 | 12/2005 | Heseltine | |
| 2006/0048682 A1 | 3/2006 | Wagh | |
| 2006/0057345 A1 | 3/2006 | Surace | |
| 2006/0059806 A1 | 3/2006 | Gosling | |
| 2006/0108175 A1 | 5/2006 | Surace | |
| 2007/0094950 A1 | 5/2007 | Surace | |
| 2007/0107350 A1 | 5/2007 | Surace | |
| 2008/0057318 A1 | 3/2008 | Adzima et al. | |
| 2008/0299413 A1 | 12/2008 | Song et al. | |
| 2009/0004448 A1 * | 1/2009 | Tinianov | B32B 13/06 156/60 |
| 2009/0011203 A1 | 1/2009 | Mock et al. | |
| 2009/0145541 A1 | 6/2009 | Xiao | |
| 2010/0055431 A1 | 3/2010 | College | |
| 2010/0143682 A1 | 6/2010 | Shake et al. | |
| 2010/0230206 A1 | 9/2010 | Tinianov et al. | |
| 2010/0258378 A1 | 10/2010 | Ravnaas | |
| 2010/0273907 A1 | 10/2010 | Frenzel | |
| 2010/0331434 A1 | 12/2010 | Shin | |
| 2011/0297310 A1 | 12/2011 | Hauber et al. | |
| 2012/0073899 A1 | 3/2012 | Fournier et al. | |
| 2013/0186705 A1 * | 7/2013 | Payot | E04B 1/86 181/284 |
| 2014/0027368 A1 | 1/2014 | Bell et al. | |
| 2014/0175320 A1 | 6/2014 | Thomas et al. | |
| 2014/0273687 A1 * | 9/2014 | Garvey | B32B 13/14 442/120 |
| 2015/0064488 A1 * | 3/2015 | Foster | C04B 28/14 428/514 |
| 2016/0111077 A1 | 4/2016 | Lu | |
| 2016/0230384 A1 | 8/2016 | Blades et al. | |

FOREIGN PATENT DOCUMENTS

| | | |
|---|---|---|
| CN | 2564642 Y | 8/2003 |
| CN | 102127935 | 7/2011 |
| DE | 4446968 | 6/1995 |
| EP | 0 282 337 A2 | 9/1988 |
| EP | 0282337 | 9/1988 |
| EP | 0 965 701 A1 | 12/1999 |
| EP | 0965701 | 12/1999 |
| EP | 2417196 B1 | 6/2016 |
| JP | S5251719 A | 4/1977 |
| JP | S5355329 A | 5/1978 |
| JP | H09203153 A | 8/1997 |
| JP | 2005186410 A | 7/2005 |
| KR | 2003368809 Y1 | 12/2003 |
| KR | 20080027177 A | 3/2008 |
| KR | 100874212 B1 | 12/2008 |
| WO | 1996034261 A1 | 10/1996 |
| WO | 1997019033 A1 | 5/1997 |
| WO | WO 99/14449 A1 | 3/1999 |
| WO | 9938663 A | 9/1999 |
| WO | 2000024690 A1 | 5/2000 |
| WO | 2000034595 | 6/2000 |
| WO | WO 02/31287 A1 | 4/2002 |
| WO | 02/098646 | 12/2002 |
| WO | 2010103322 A2 | 9/2010 |
| WO | 2012116162 A1 | 8/2012 |
| WO | WO 2013/045602 A2 | 4/2013 |

OTHER PUBLICATIONS

Written Opinion issued in co-pending International Patent Application No. PCT/US2017/066780, European Patent Office, dated Mar. 21, 2018, 7 pages.

Davy, John Laurence et al., "The Damping of Gypsum Plaster Board Wooden Stud Cavity Walls," Applied Acoustics, dated Sep. 3, 2014, vol. 88, pp. 52-56.

"CertainTeed SilentFX QuickCut Noise-Reducing Gypsum Board," CertainTeed Corporation Product Brochure, dated Dec. 2015, 12 pages.

"Sheet," Definition of Sheet by Merriam-Webster dated May 16, 2016, http://www.merriam-webster.com/dictionary/sheet, 11 pages.

Lippiatt, B.C., National Institute of Standards and Technology. BEES 3.0, "Building for Environmental and Economic Sustainability Technical Manual and User Guide", Oct. 2002, (198 pages).

CertainTeed, "QuietRock 510 Installation Instructions", Jul. 2010, (date accessed Aug. 13, 2014), https://www.certainteed.com/resources/CTG_2823_QR510_Installation_E.pdf.

Noise Killer Pro Damping Compound Materials http://www.tnt-audio.com/clinica/noise.html May 18, 2007, 1998 (3 pages).

Non-Final Office Action dated May 3, 2013 from U.S. Appl. No. 11/697,691, 14 pages.

Patent Examination Report No. 1 dated Apr. 24, 2013, from Australian Application No. 2008237205, 5 pages.

Marty, R. "Data support use of P-Cell in diabetic footwear", CMP Media LLC, Mar. 1, 2003.

Ostegaard, P.B. et al. "Transmission Loss of Leaded Building Materials," The Journal of the Acoustical Society of America, vol. 35, No. 6, Jun. 1963.

Unified Facilities Criteria (UFC) Noise and Vibration Control, UFC 3-450-01. May 15, 2003, Department of Defense.

(56) References Cited

OTHER PUBLICATIONS

Wood Handbook/Wood as an Engineering Material, United States Department of Agriculture, Forest Service, General Technical Report FPL-FGTR-113, Mar. 1999.

ASC WallDamp materials from Acoustic Sciences Corporation http://web.archive.org/web/20021013031149/www.asc-soundproof.com:80/index-walldamp . . . (accessed May 3, 2021) 11 pages.

ADM Technologies, USA, Dynamic Control http://web.archive.org/web/20010518083911/www.admteschusa.com . . . (accessed May 3, 2021) 21 pages.

Nordisk Akustik A/S materials, LDL for sandwhich-construktions, http://web.archive.org/web/200206240933724/www.nordisk-akustik.dk/html_uk/prod03.html (accessed May 3, 2021) 2 pages.

Noxon, A.M. "The Chain is as Strong as Its Weakest Link" Acoustic Sciences Corporation, http://www.art-noxon.com/articles/chain.htm (accessed May 3, 2021). 8 pages.

Sharp, B.H. "A Study of Techniques to Increase the Sound Insulation of Building Elements" Prepared for the Department of Housing and Urban Development, Washington, D.C. Jun. 1973.

Opposition in European Pat. No. 3554822, Preliminary opinion of opposition division, Feb. 28, 2023.

Opposition in European Pat. No. 3554822, Patent Proprietor's auxiliary requests during opposition procedure, Dec. 12, 2022.

Opposition in European Pat. No. 3554822, Patent Proprietor's main request during opposition procedure, Dec. 12, 2022.

Opposition in European Pat. No. 3554822, Patent Proprietor's Reply during opposition procedure, Dec. 12, 2022.

ASTM E-756-05, Standard Test Method for Measuring Vibration-Damping Properties of Materials (2005).

Opposition in European Pat. No. 3554822, Notice of Opposition, Jul. 8, 2022.

* cited by examiner

PLASTER BOARDS AND METHODS FOR
MAKING THEM

CROSS-REFERENCE TO RELATED
APPLICATIONS

This application claims the benefit of priority of U.S. Provisional Patent Application No. 62/434,984, filed Dec. 15, 2016, which is hereby incorporated herein by reference in its entirety.

BACKGROUND OF THE DISCLOSURE

1. Field of the Disclosure

The present disclosure relates generally to plaster boards and methods for making plaster boards. The present disclosure relates more particularly to plaster boards having continuous layer of material (e.g., a polymer material such as a damping polymer) disposed within a body of plaster material.

2. Technical Background

Plaster boards, often called "sheet rock" or "drywall", are typically used to construct walls within homes, businesses, or other buildings. Plaster boards are very often made of gypsum, but other materials, including lime and cement, are also used. A typical method for making a plaster board involves dispensing and spreading a plaster material (e.g., a slurry of gypsum in water) onto a paper sheet or fiberglass mat on a platform, and covering the plaster material with another paper sheet or fiberglass mat. This sandwiched structure is fed through rollers to provide a structure of a desired thickness, then allowed to cure to form a hardened plaster material disposed between the two sheets of paper or fiberglass. The plaster board may be cut into sections having predetermined lengths and widths that conform to accepted construction standards.

Soundproofing is becoming an ever-increasing concern for the construction industry, for example, for use in residences, hotels, schools and hospitals. Soundproofing is also desirable in the construction of theaters and music studios, to insulate noise made in those areas from surrounding rooms. Model building codes and design guidelines often specify minimum Sound Transmission Class values for wall structures within buildings. While a number of construction techniques have been used to address the problem of soundproofing, one especially desirable technique uses sound-damping plaster boards that can be used in place of conventional drywall boards various residential or commercial structures.

A sound-damping plaster board typically includes a damping sheet having viscoelastic properties disposed between two layers of hardened plaster material. Some methods for making a sound-damping plaster board include a "two-step" process of forming a plaster board as described above, slicing the plaster board in half through its thickness, then bonding the exposed plaster surfaces together with an adhesive that cures into a viscoelastic polymer. While this process can leverage existing plaster board manufacturing processes, it is disadvantageous in at least two ways. First, it involves cutting the plaster board, which is not only time consuming and messy, but can also structurally weaken the plaster material. Second, it involves a separate process of laminating the two plaster boards together with the viscoelastic material, which can create product defects such as misalignment of the two boards and delamination if the viscoelastic material does not have sufficient adhesion strength. These deficiencies apply not only to the manufacture of sound-damping plaster boards, but also to the manufacture of multi-plaster boards having a sheet of material disposed within a body hardened plaster material.

Accordingly, what are needed are improved processes for making laminated plaster sound-damping plaster boards, and sound-damping plaster boards amenable for production by such processes with better product quality.

SUMMARY OF THE DISCLOSURE

In one aspect, the present disclosure provides a plaster board having a first surface and an opposed second surface, the plaster board comprising
  a body of hardened plaster material extending from the first surface of the plaster board to the second surface of the plaster board, and
  one or more continuous layers of material disposed within the body, each continuous layer of material having a first side and an opposed second side, the first side and second side of each continuous layer of material being substantially covered by the hardened plaster material.
In certain such embodiments, each continuous layer of material is a sheet comprising a carrier sheet having a polymer disposed thereon. For example, the polymer can be a damping polymer, such that the sheet is a damping sheet having a damping loss factor that is greater than a damping loss factor of the hardened plaster material.

Another aspect of the disclosure is a method for making a plaster board as described herein. The method includes
  providing a wet plaster board precursor having a first surface and an opposed second surface, the wet plaster board precursor comprising:
    a body of wet plaster material extending from the first surface of the wet plaster board precursor to the second surface of the wet plaster board precursor; and
    one or more continuous layers of material or precursors therefor disposed within the body of wet plaster material, each continuous layer of material or precursor therefor having a first side and an opposed second side, the first side and the second side of each continuous layer of material or precursor therefor being substantially covered by the wet plaster material; and
  drying the wet plaster board precursor such that the wet plaster material hardens into the body of hardened plaster material, and such that continuous layer of material or precursor therefor forms the continuous layer of material within the body of hardened plaster material.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
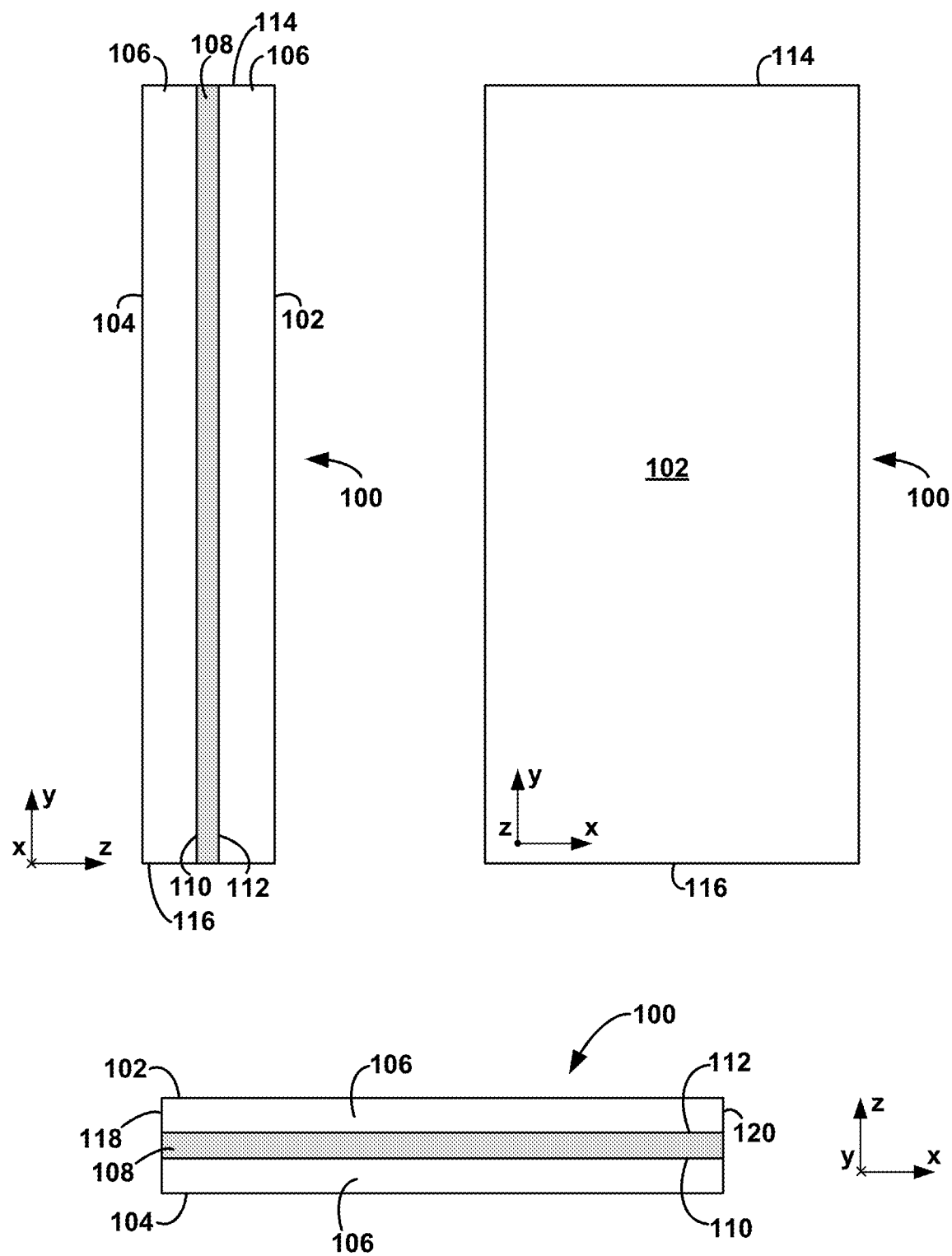
FIG. 1 is a set of three schematic views of a plaster board according to one embodiment of the disclosure.

The present inventors have noted disadvantages of existing processes for forming sound damping plaster boards or plaster boards having other sheets of material (i.e., having any desired function) disposed therein. Conventional plaster boards are formed between sheets of paper or fiberglass mat. While these can provide a surface on the plaster board suitable for painting and to protect the surface of the plaster board before and after installation, they can create difficulties in the lamination of such a plaster board to other materials. The aforementioned "two-step" process for bonding plaster boards together thus requires the cutting to expose the gypsum surface to facilitate proper bonding. Such processes are time-consuming, costly, and may cause the plaster boards to warp or break. Additionally, these "two-step" processes inherently involve unnecessary processing time in that the plaster boards are formed and dried before they are adhered together, after which additional time is allotted for the drying of the adhesive that bonds the plaster boards together.

Accordingly, one aspect of the disclosure is a plaster board having a first surface and an opposed second surface. The plaster board includes a body of hardened plaster material extending from the first surface of the plaster board to the second surface of the plaster board, and one or more continuous layers of material (e.g., acoustic layers) disposed within the body, each continuous layer having a first side and an opposed second side, the first side and second side of each continuous layer of material) being substantially covered by the hardened plaster material. As will be described in more detail below, such a plaster board can be produced by drying wet plaster material while the continuous layer of material (or a precursor thereof) is disposed within the wet plaster material.

As noted above, in certain embodiments, each of the continuous layers of material is an acoustic layer, i.e., a layer that can provide the overall structure with reduced sound transmission (i.e., as compared to an otherwise identical plaster board lacking the acoustic layer). The acoustic layer can be, for example, a damping sheet. As used herein, a damping sheet can provide an increased damping loss to the overall structure (i.e., as compared to an otherwise identical plaster board lacking the damping sheet). While the detailed description of the present specification focuses primarily on damping sheets as an example, the person of ordinary skill in the art will appreciate that layers of other material can be present in the plaster board. For example, a different type of acoustic layer can be used (i.e., instead of or in addition to a damping sheet), e.g., a layer that decouples vibrations in one side of the body of plaster material from the other side of the body of plaster material, such as a foam or a fabric layer. And in still other embodiments, a different layer entirely can be used. For example, each of the continuous layers of material can be, for example, a polymer sheet, a fabric sheet, or a metal sheet. Such layers can provide a variety of properties to the plaster board, such as increased strength and increased nail pull-out values. And the person of ordinary skill in the art will appreciate that any combination of such layers can be used.

As described above, in certain embodiments, each of the continuous layers of material is a damping sheet. Such a damping sheet can have, for example, a damping loss factor greater than 1%, e.g., greater than 2%, or greater than 3%, or greater than 5%, or greater than 10%, for example, in the range of 1%-50%, or 2%-50%, or 3%-50%, or 5%-50%, or 10%-50%, or 1%-40%, or 2%-40%, or 3%-40%, or 5%-40%, or 10%-40%, or 1%-30%, or 2%-30%, or 3%-30%, or 5%-30%, or 10%-30%. This can be compared with the much lower value, lower than 1% for typical plaster materials such as gypsum. As referred to herein, and as would be appreciated by the person of ordinary skill in the art, a "damping loss factor" is a dimensionless metric of how efficient a material is at dissipating mechanical vibrations (e.g., sound waves) as heat. In a laminated gypsum board, as in other laminated structures, the working mechanism for noise and vibration control is known as constrained layer damping (CLD). Energy dissipation in laminated gypsum board is achieved by shearing the viscoelastic polymer between two layers of gypsum. The energy dissipation provided by the interlayer is quantified by the loss factor ($\eta$), a dimensionless quantity that can be measured directly or predicted from the modal damping of a dynamic system based on the RKU algorithm. Several standards are available for measuring the damping of a laminated structure (e.g., SAE J1737 or ISP 16940-2009); however, as used herein, ASTM E75-05 is used to measure the damping loss factor. Damping loss factor is further described in Crane, R. and Gillespie, J., "A Robust Testing Method for Determination of the Damping Loss Factor of Composites," Journal of Composites, Technology and Research, Vol. 14, No. 2, 1992, pp. 70-79; Kerwin et al., "Damping of Flexural Vibrations by means of Constrained Viscoelastic Laminate," Journal of Acoustic Society of America, 1959, pp. 952-962; and Ross, D. et al., "Damping of Flexural Vibrations by Means of Viscoelastic laminate", in Structural Damping, ASME, New York, 1959.

In certain embodiments as otherwise described herein, a continuous layer of material includes a carrier sheet with a polymer disposed thereon. As described in further detail below, such a continuous layer can be made by applying a precursor of the polymer on a carrier sheet, disposing the precursor-coated carrier sheet within a body of wet plaster material, and allowing the precursor to cure when within the body of plaster material (e.g., as the body of plaster material dries). Alternatively a pre-formed carrier sheet with the polymer disposed thereon can be disposed within a body of wet plaster material, which is then allowed to dry. In certain embodiments, for example, the continuous layer of material is a damping sheet that comprises a carrier sheet that has a damping polymer disposed thereon. In various embodiments, the damping polymer itself has a damping loss factor as described above for the overall sheet.

In alternative embodiments, a continuous layer of material is provided as a continuous sheet of material (i.e., without a carrier sheet), e.g., a sheet of polymer, a sheet of fabric, or a sheet of metal. The continuous layer can be, for example, a sheet of a damping polymer. As described in more detail below, such a continuous layer can be made in certain embodiments by disposing the continuous sheet or a precursor thereof in As the person of ordinary skill in the art will appreciate, a variety of materials can be used as the damping polymer, for example, a so-called "viscoelastic polymer." In various particular embodiments, the damping polymer is in the form of a glue, a resin, an epoxy, for example.

Desirably, the damping sheet and/or damping polymer exhibits large stress/strain delay or phase difference under loading. These materials can be characterized by Dynamic-Mechanical Analysis (DMA), a technique commonly used to measure the mechanical and damping properties of polymer materials. The shear modulus (also known as the modulus of rigidity) is defined as the ratio of shear stress to shear strain; in certain particular embodiments as otherwise described herein, the damping sheet and/or damping polymer has a shear modulus in the range of 10 kPa to 100 MPa, e.g., 10 kPa-50 MPa, or 10 kPa-10 MPa, or 10 kPa-1 MPa, or 50 kPa to 100 MPa, or 50 kPa-50 MPa, or 50 kPa-10 MPa, or 50 kPa-1 MPa, or 100 kPa to 100 MPa, or 100 kPa-50 MPa, or 100 kPa-10 MPa, or 100 kPa-1 MPa. This can be compared to the elastic modulus of plaster materials (e.g., ~2 GPa for gypsum).

In certain desirable embodiments of the plaster boards and methods as described herein, the damping sheet and/or damping polymer is substantially less rigid than the hardened plaster material. For example, in certain embodiments, the damping sheet is at least 20% less, or even at least about 40% less rigid or stiff than the body of hardened plaster material. There are a variety of tests of rigidity (e.g., SAE J1737 and ISP 16940-2009), but as used herein, rigidity is measured via ASTM E75-05. In other embodiments, the plaster board is substantially less rigid (e.g., at least 20% less rigid or at least 40% less rigid) than an otherwise identical plaster board lacking the one or more continuous layers of material (e.g., damping sheets).

One embodiment of such a plaster board is described with respect to FIG. 1, which shows three views of a plaster board 100. The upper-left portion of FIG. 1 is a y-z plane view of the plaster board 100. The upper-right portion of FIG. 1 is an x-y plane view of the plaster board 100. The lower portion of FIG. 1 is an x-z plane view of the plaster board 100. The plaster board 100 includes opposing surfaces 102 and 104, a body of hardened plaster material 106, and a damping sheet 108 having opposing sides 110 and 112, disposed within the body of hardened plaster material.

In certain embodiments, a damping sheet completely separates the body of hardened plaster material into two sections. For example, in the example of FIG. 1, the body of hardened plaster material 106 may take the form of two sections of hardened plaster material separated by the damping sheet 108. The body of hardened plaster material 106 may extend from the surface 102 to the surface 104 on opposite sides of the plaster board 100. While the hardened plaster material may be separated into two non-touching sections, for the purposes of the description herein the hardened plaster material is nonetheless considered to be a single "body." In other embodiments, and as described with respect to FIG. 2 below, the one or damping sheets do not extend throughout the entire plane of the board, and thus allow the entire body of hardened plaster material to be continuous.

As the person of ordinary skill in the art will appreciate, the plaster boards described herein may be made using a variety of different inorganic base materials. For example, in certain embodiments of the plaster boards and methods as otherwise described herein, the plaster material comprises a base material that is a gypsum material. In other embodiments of the plaster boards and methods as otherwise described herein, the plaster material comprises a base material that is, for example, lime or cement. In certain embodiments, the body of hardened plaster material includes two base materials, for example, one generally on one side of the one or more sheets of damping material, and the other on the other side of the one or more sheets of damping material. The hardened plaster material may include one or more fillers or additives in the base plaster material(s), e.g., fiberglass, a plasticizer material, a foaming agent, and/or ethylenediaminetetraacetic acid (EDTA).

In plaster board 100 of FIG. 1, the damping sheet 108 is disposed within the body of hardened plaster material 106. In the embodiment of FIG. 1, the opposing sides 110 and 112 of the damping sheet 108 are substantially covered by the body of hardened plaster material 106, such that substantially none of the damping material is visible at either of the first surface or the second surface of the plaster board.

As described above, in various embodiments of the plaster boards and methods as described herein, the damping sheet 108 is made up of a carrier sheet having a damping polymer disposed thereon. The carrier sheet (whether used in a damping layer or in a different continuous layer) can be formed from a variety of materials, e.g., sheet materials that are capable of carrying a damping polymer. For example, in certain embodiments of the plaster boards and methods as described herein, the carrier sheet comprises (or is) a paper sheet. In other embodiments of the plaster boards and methods as described herein, the carrier sheet comprises (or is) a fiberglass mat or a fiberglass fabric. In other embodiments of the plaster boards and methods as described herein, the carrier sheet comprises (or is) a woven or non-woven fabric, such as a felt. In other embodiments of the plaster boards and methods as described herein, the carrier sheet comprises (or is) a sheet of foamed polymer, e.g., the foamed polymer sheet sold by BASF under the trade name BASOTECT. In other embodiments of the plaster boards and methods as described herein, the carrier sheet comprises (or is) a polymer sheet, e.g., a thin polymer sheet of the type typically used as a plastic release liner for an adhesive, which can be, for example in the range of 0.001-0.002" thick. In other embodiments, the carrier sheet can be an adhesive sheet, e.g., with adhesive such as a pressure-sensitive adhesive presented at one or both surfaces thereof. Such pressure-sensitive adhesive sheets can be formed from a core sheet (made, e.g., from PVC or PET) with adhesive (e.g., a silicone pressure-sensitive adhesive or a polyacrylate adhesive) disposed on both sides thereof. Any release liners can be removed before use The damping polymer may include or be filled with a fire resistant material (e.g., zinc borate) and/or a mold resistant material.

The damping polymer can be disposed on the carrier sheet in variety of manners. For example, in certain embodiments of the plaster boards and methods as described herein, the damping polymer is impregnated on the carrier sheet (e.g., when the carrier sheet has some level of porosity). In certain embodiments, the damping polymer is formed as a layer on one or both sides of the carrier sheet. The damping polymer can, for example, be impregnated into the pores of the carrier sheet and form layers on either side of the carrier sheet.

As noted above, a variety of damping polymers can be used in the plaster boards and methods of the disclosure. In various embodiments of the plaster boards and methods as described herein, the viscoelastic polymer is polyvinyl butryal, a silicone, or an acrylic. The viscoelastic polymer can be a thermally-cured material, e.g., a cured adhesive such as those available under the tradenames GreenGlue. Various viscoelastic glues made by Weber may also be suitable for use. Damping polymer compositions are also described in U.S. Pat. Nos. 8,028,800 and 9,157,241, each of which is hereby incorporated herein by reference in its entirety.

Each of the continuous layers (e.g., each damping sheet) can, but need not extend to all edges of the plaster board. For example, in the embodiment of FIG. 1, the damping sheet extends substantially throughout the body of hardened plaster material 106 within the x-y plane and/or substantially parallel to the surfaces 102 and 104, to all four edges of the rectangular board. In certain embodiments, the damping sheet extends to at least two opposed lateral edges of the plaster board. For example, the damping sheet 108 of the embodiment of FIG. 1 extends from the edge 114 to the edge 116 and from the edge 118 to the edge 120.

As the person of ordinary skill in the art will appreciate, each of the continuous layers (e.g., each damping sheet) is desirably embedded substantially within the plaster board. For example, in certain embodiments of the plaster boards and methods as otherwise described herein, the thickness of the plaster body on one side of the continuous layer (e.g., damping sheet) is within the range of 33%-300% (e.g., 50%-200%, or 75%-150%) of the thickness of the plaster body on the other side of the continuous layer (e.g., damping sheet). In certain such embodiments, the thickness of the plaster body on one side of the continuous layer (e.g., damping sheet) is within 10% of the thickness of the plaster body on the other side of the continuous layer (e.g., damping sheet). For example, in the embodiment of FIG. 1 (as shown in the lower portion thereof), the section of the body of hardened plaster material 106 that is above the damping sheet 108 is substantially equal in thickness along the z-axis when compared to the section of the body of hardened plaster material 106 that is below the damping sheet 108. Of course, in other examples, the respective sections of the body of hardened plaster material above and below the continuous layer (e.g., damping sheet) may have unequal thicknesses along the z-axis. This variability in the placement of the damping sheet may affect the sound damping characteristics of the plaster board as described below. And in other embodiments, the variability in placement of a continuous layer may affect other characteristics of the plaster board, such as mechanical strength, nail pull strength and score-snap performance; the person of ordinary skill in the art will select a desired placement to provide the desired properties to the board. Moreover, the different layers of the hardened plaster material can have different densities and/or microstructures (or other properties), e.g., through the differential use of fillers or foaming agents; this, too, can be used to tailor board properties, particularly acoustic properties.

In certain embodiments of the plaster boards and methods as otherwise described herein, there is at least 0.15, or even at least 0.2 inches of thickness of the plaster board material between the continuous layer (e.g., damping sheet) and the first surface of the plaster board, and between the continuous layer (e.g., damping sheet) and the second surface of the plaster board.

The plaster boards of the present disclosure may be made in a variety of thicknesses. The person of ordinary skill in the art will select a desirable thickness for a particular end use. In certain embodiments of the plaster boards and methods as otherwise described herein, the total thickness of the plaster board (i.e., along the z-axis between the surfaces 102 and 104 of FIG. 1) is at least 0.25 inches and no more than 2 inches, e.g., in the range of 0.30 inches to 1.25 inch. or in the range of 0.5 inch to 1 inch. In certain particular embodiments, the total thickness of the plaster board is substantially equal to 0.375 inches. In other particular embodiments, the total thickness of the plaster board is substantially equal to 0.5 inches. In still other particular embodiments, the total thickness of the plaster board is substantially equal to 0.625 inches. And in still other particular embodiments, the total thickness of the plaster board is substantially equal to one inch (e.g., especially when lower density plaster materials are used).

As noted above, the use of a layer of material within the body of a plaster board can help to improve a number of properties of the plaster board. This can be especially desirable when the plaster material has a relatively low density, as such low density materials, while light and therefore desirable for an installer, can have relatively worse properties as compared to higher density materials. But use of a layer can described herein can help improve the properties of such materials, e.g., nail pull values. In certain embodiments, the hardened plaster material has a density in the range of 0.40-0.65 g/cm$^3$.

The person of ordinary skill in the art will appreciate, however, that the presently disclosed methods and boards can be of a variety of thicknesses and weights. For example, the board can be a lightweight board ⅝" in thickness with a weight on the order of 1400 lb/MSF (MSF=1,000 square feet), or can be a lightweight board 1" in thickness with a weight on the order of 2240 lb/MSF. Generally, boards can be made in any desirable weight, for example, from lightweight (1200 lb/MSF) to normal weight (2000 lb/MSF) to heavy weight (3000 lb/MSF), in any desirable thickness (e.g., ½", ⅝" or 1" thick). And as the person of ordinary skill in the art will appreciate, additional thin layers of plaster material (e.g., gypsum, usually of higher density than the bulk material) can be applied to the outsides of the paper or fiberglass layers cladding the plaster material core, in order to help improve mechanical strength.

Figure 2:
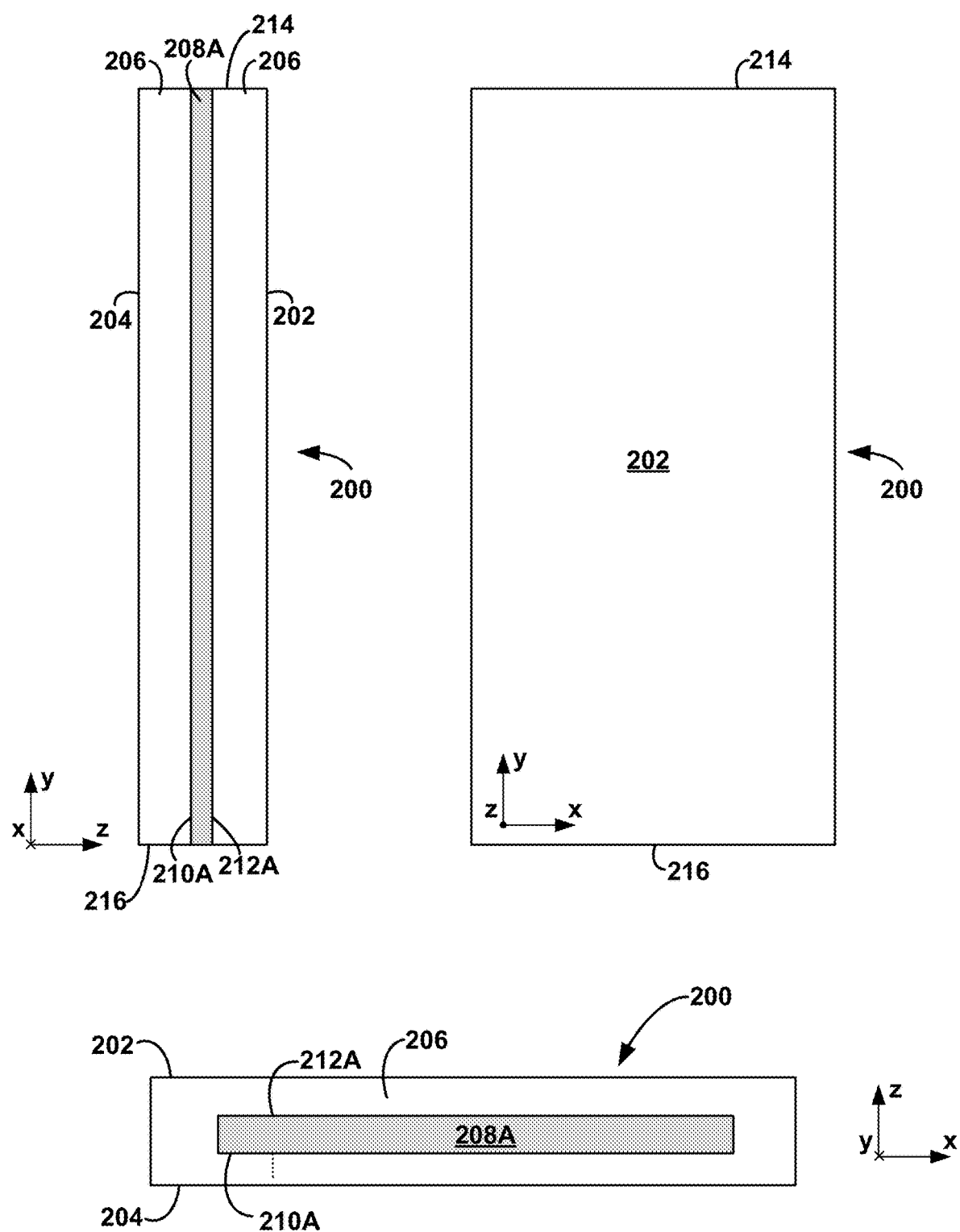
FIG. 2 is a set of three schematic views of a plaster board according to another embodiment of the disclosure.

In certain embodiments of the plaster boards and methods as described herein, the continuous layer (e.g., damping sheet) does not extend all the way to at least one of the lateral edges of the board. For example, in certain embodiments, and as shown in FIG. 2, the continuous layer (e.g., damping sheet) does not extend all the way to two opposed lateral edges of the board (e.g., by at least an inch or even at least two inches). In certain such embodiments, the continuous layer (e.g., damping sheet) does not extend to two opposed lateral edges of the board, by a distance in the range of 1-12", or 2-12" on each of the two lateral edges. In certain such embodiments, the damping sheet does extend to two other opposed lateral edges of the board. FIG. 2 shows three views of a plaster board 200. The upper-left portion of FIG. 2 is a y-z plane cross-sectional view of the plaster board 200. The upper-right portion of FIG. 2 is an x-y plane view of the plaster board 200. The lower portion of FIG. 2 is an x-z plane view of the plaster board 200. Here, damping sheet 208 does not extend all the way to the two opposed side edges 217 and 218, but does extend all the way to the two opposed side edges 214 and 216.

Figure 3:
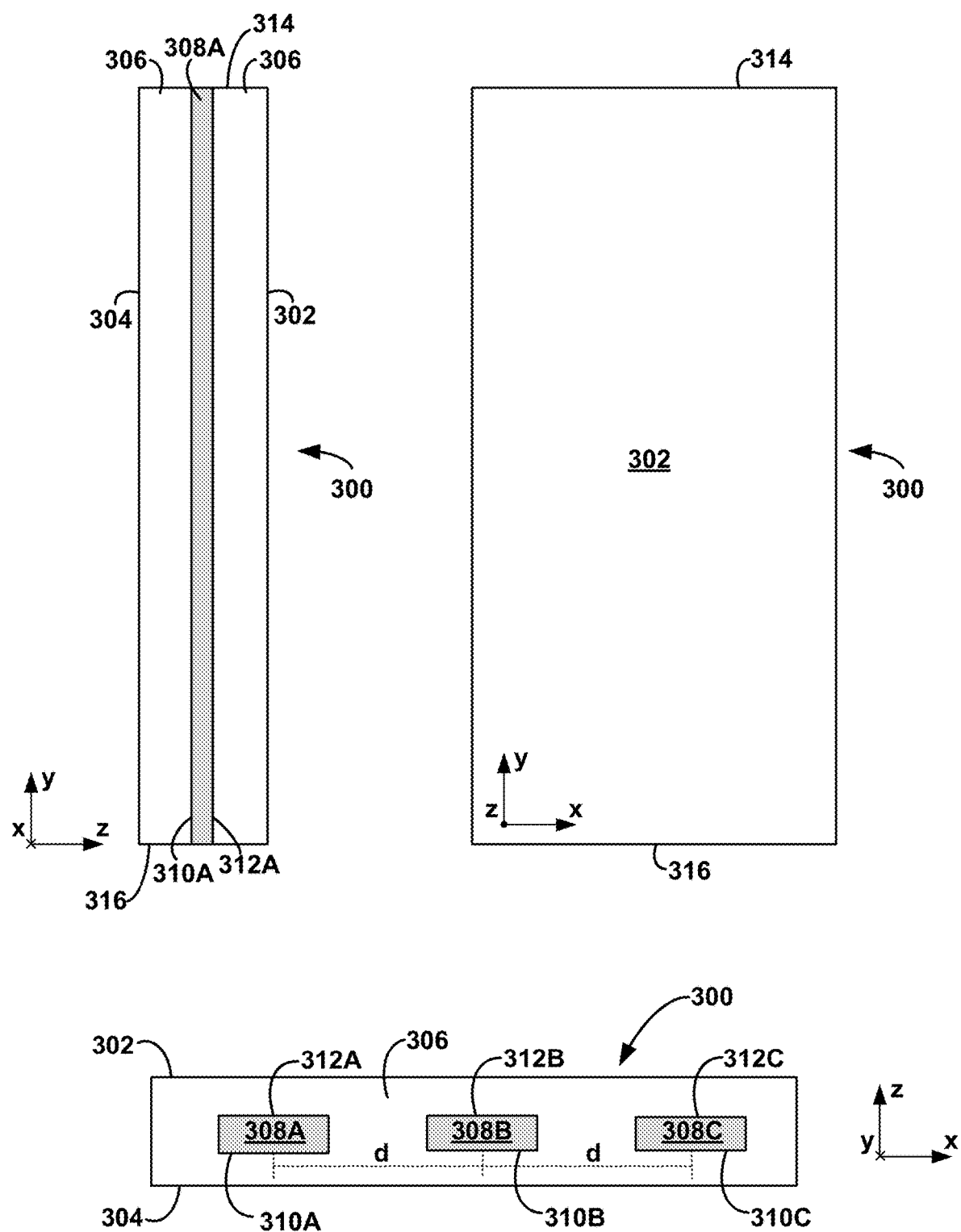
FIG. 3 is a set of three schematic views of a plaster board according to another embodiment of the disclosure.

The embodiments of FIGS. 1 and 2 each have only a single continuous layer (e.g., damping sheet). However, as the person of ordinary skill in the art will appreciate, in certain alternative embodiments, multiple continuous layer (e.g., damping sheet) can be disposed within the body of plaster material. The multiple continuous layers (e.g., damping sheets) can be disposed side-by-side with respect to one another, e.g., substantially parallel to the plane of the board. For example, FIG. 3 shows three views of a plaster board 300. The upper-left portion of FIG. 3 is a y-z plane cross-sectional view of the plaster board 300. The upper-right portion of FIG. 3 is an x-y plane view of the plaster board 300. The lower portion of FIG. 3 is an x-z plane view of the plaster board 300. The plaster board 300 includes opposing surfaces 302 and 304, a body of hardened plaster material 306, and damping sheets 308A. 308B, and 308C. The damping sheet 308A has opposing sides 310A and 312A. The damping sheet 308B has opposing sides 310B and 312B. The damping sheet 308C has opposing sides 310C and 312C. In the embodiment of FIG. 3, the body of hardened plaster material 306 substantially surrounds the damping sheets 308A, 308B, and 308C in at least one plane of the board (here, the x-z plane). The body of hardened plaster material 306 extends from the surface 302 to the surface 304 on the opposite sides of the plaster board 300. The body of hardened plaster material 306 may include any materials that are included within the body of hardened plaster material 106, as described above. The damping sheets 308A, 308B, and 308C are each disposed within the body of hardened plaster material 306. The opposing sides 310A and 312A of the damping sheet 208A are each substantially covered by the body of hardened plaster material 306. The opposing sides 310B and 312B of the damping sheet 308B may each be substantially covered by the body of hardened plaster material 306. The opposing sides 310C and 312C of the damping sheet 308C may each be substantially covered by the body of hardened plaster material 306. But while the damping sheets do not extend to opposed lateral edges 316 and 317 of the plaster board, they do extend to the other two opposed lateral edges 314 and 316.

When multiple continuous layers (e.g., damping sheets) are provided, they can be provided in a number of different configurations. For example, the respective centerlines of the damping sheets 208A, 208B, and 208C run substantially parallel to the y-axis as shown in FIG. 2. When multiple damping sheets are provided in a side-by-side arrangement, they can be provided with some distance between their edges, e.g., in the range of 1 inch to 12 inches, or in the range of 1 inches to 8 inches. The respective centerlines may be separated by distances (d) such as 16 inches or 24 inches along the x-axis, for example. This can allow for the plaster board to be nailed through the body of plaster material between the damping sheets into studs spaced with standard industry spacings. Of course, other spacings along the x-axis are possible as well.

As the person of ordinary skill in the art will appreciate, the plaster board 300 can be formed with any of the features described generally herein, e.g., the thicknesses as described above, and the materials as described above.

Advantageously, the plaster boards described herein can be made via an in-line method in which the continuous layer or a precursor thereof is embedded within the body of plaster material while the body of plaster is still wet (e.g., in slurry form). This can be, for example, in the form of a carrier sheet and a precursor for a polymer material to be disposed thereon; a carrier sheet with a polymer material disposed thereon; a continuous sheet of material per se, or even merely a precursor for a polymer material (e.g., as a liquid or semisolid). Thus, there is no need to remove a paper or fiberglass backing in order to provide the continuous layer (e.g., damping sheet) within the body of plaster material. Accordingly, another aspect of the disclosure is a method for making a plaster board as described herein, the method including providing a wet plaster board precursor having a first surface and an opposed second surface, the wet plaster board precursor including: a body of wet plaster material extending from the first surface of the wet plaster board precursor to the second surface of the wet plaster board precursor; and one or more continuous layers of material or precursors thereof disposed within the body of wet plaster material, each continuous layer of material or precursor thereof sheet having a first side and an opposed second side, the first side and the second side of each continuous layer of material or precursor thereof being substantially covered by the wet plaster material; and drying the wet plaster board precursor such that the wet plaster material hardens into the body of hardened plaster material and such that the continuous layer of material or precursor thereof form the continuous layer of material within the body of hardened plaster material. Such methods can be made using processes familiar to the person of ordinary skill in the art, using standard procedures and equipment for making, e.g., gypsum wallboards.

While the methods are generally described below with respect to the use of a damping precursor sheet to make a damping sheet, the person of ordinary skill in the art will appreciate, based on the disclosure herein, that analogous methods can be used to make a plaster board having a different continuous layer disposed in a plaster body.

Figure 4:
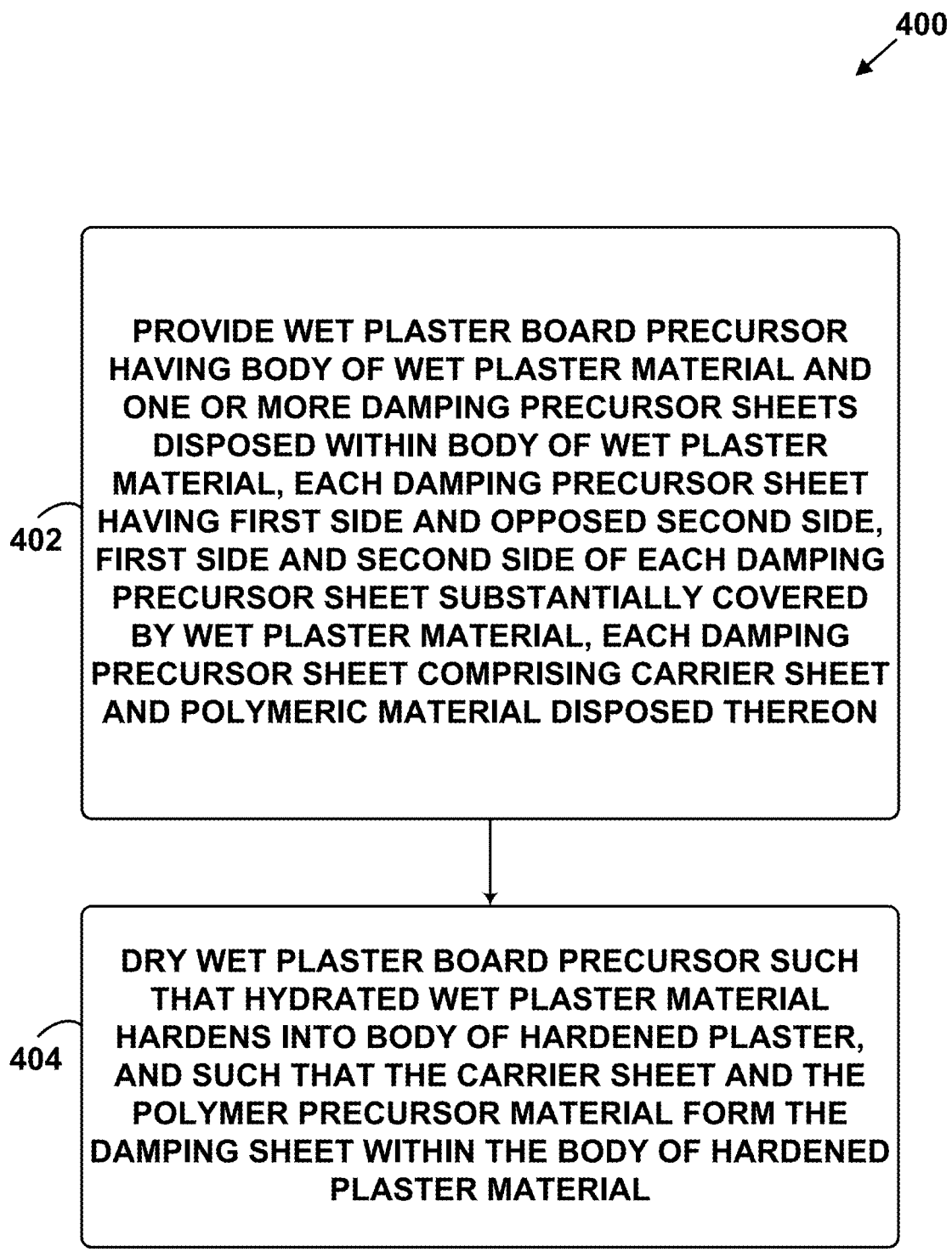
FIG. 4 is a block diagram of a method for making a plaster board according to one embodiment of the disclosure.
Figure 5:
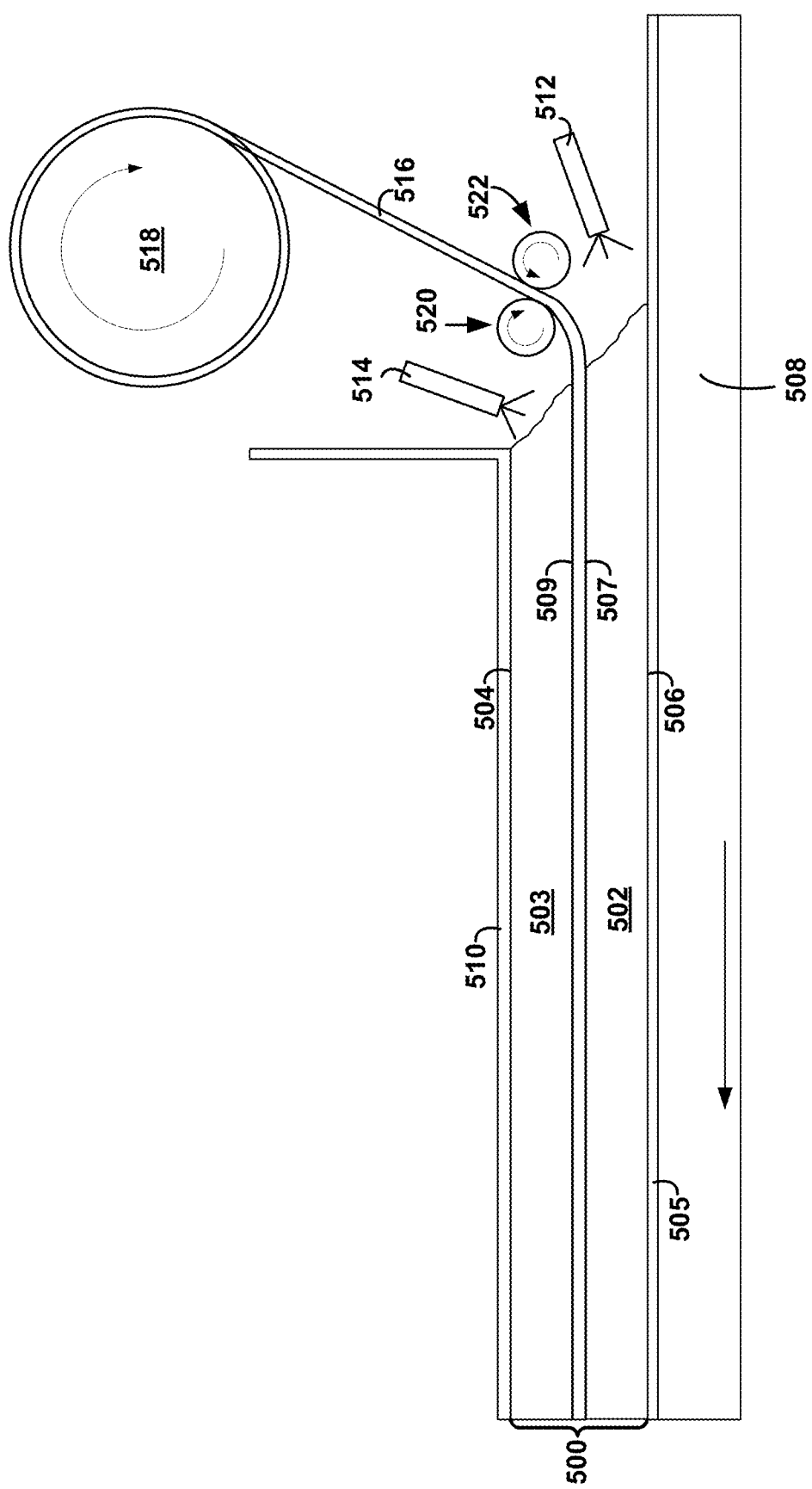
FIG. 5 is a schematic view of an apparatus and method for making a plaster board according to another embodiment of the disclosure.

FIG. 4 is a block diagram of a method 400 for making a plaster board. The method 400 may be used to make the plaster boards 100 and/or 200, for example. At block 402, the method 400 may include providing a wet plaster board precursor having a first surface and an opposed second surface. Referring to FIG. 5, for example, the wet plaster board precursor 500 is provided. The wet plaster board precursor is a wet body (i.e., with water) that can be dried to provide a plaster board as described above. It includes a body of wet plaster material 502 extending from a surface 504 of the wet plaster board precursor 500 to a surface 506 of the wet plaster board precursor 500. The wet plaster material is a wet, formable plaster material that can harden to provide the hardened plaster material. The wet plaster material can be, for example, a gypsum slurry, or a slurry (i.e., when the hardened plaster material is a gypsum material). In other embodiments, the wet plaster material is a wet lime material or a wet cement material. But the person of ordinary skill in the art will appreciate that a variety of wet plaster materials can be used in the practice of the processes as described herein. The wet plaster material can include any additives or fillers familiar to the person of ordinary skill in the art, including those described above with respect to the hardened plaster material. The wet plaster material is desirably a semiliquid or otherwise formable mixture that can be, for example, dispensed and spread onto a surface such as a platform or conveyer.

The wet plaster board precursor 500 also includes one or more damping precursor sheets 516 disposed within the body of wet plaster material 502. The damping precursor sheet(s) 516 each has a side 507 and an opposed side 509.

The side(s) 507 and the side(s) 509 of each of the damping precursor sheet(s) 516 are substantially covered by the body of wet plaster material 502. Each of the damping precursor sheet(s) 516 includes a carrier sheet and a polymer precursor material disposed on the carrier sheet. The carrier sheet can be, for example, as described above with respect to the plaster boards of the precursor. The polymer precursor material is a material that provides the viscoelastic polymer in the plaster boards of the disclosure. It can be, for example, a material that cures during the hardening of the plaster (e.g., to form a viscoelastic polymer as described above). Accordingly, a carrier sheet can be impregnated with a liquid or semiliquid thermally-curable formulation to be disposed within a wet plaster body; the heat generated by the hardening of the plaster can effectively cure the formulation into the viscoelastic polymer. Alternatively, the polymer precursor material can be a damping polymer (e.g., as described above) disposed on a carrier sheet, that can be disposed in the wet plaster material with the wet plaster material hardening against it. In certain such cases, the damping polymer is in a particulate or divided form, with the heat generated by the hardening of the plaster material being sufficient to soften the damping polymer to allow it to intimately contact the plaster body upon hardening. In certain embodiments, the damping precursor sheet can be prefabricated (e.g., in a separate process, or even offsite by a toll manufacturer) for use in the presently described processes.

And in other embodiments, the damping precursor sheet can be a sheet of a damping polymer, e.g., without a carrier sheet. Such a material can be provided in roll form as described in more detail below.

In some examples, providing the wet plaster board precursor 500 may involve dispensing the body of wet plaster material 502 onto a platform 508. The platform 508 may be a stationary platform like a table in some examples. In other examples, the platform 508 may take the form of a moving conveyor and providing the wet plaster board precursor 500 may involve dispensing the body of wet plaster material 502 onto the conveyor as the conveyor moves from right to left (e.g., with reference to FIG. 5). As the person of ordinary skill in the art will appreciate, a length of paper, fiberglass mat or fabric, or other backing material may be disposed platform, such that the wet plaster material is dispensed on and spread onto the backing material. In such embodiments, the paper, fiberglass or other backing material will remain at the surfaces of the plaster board, as is conventional for wallboard materials.

The continuous layer or precursor thereof (e.g., damping precursor sheet(s) as described above) may be provided in the body of wet plaster material in a variety of manners. For example, the process can include providing a first layer of wet plaster material, providing the one or more continuous layers or precursors thereof on the first layer of wet plaster material, and providing a second layer of wet plaster material on the one or more continuous layers or precursors thereof. This can be done in an in-line process. For example, in the embodiment of FIG. 5, a sheet of paper 505 is disposed on a platform 508 (here, a conveyer travelling from right to left as indicated by the arrow. A first layer of wet plaster material 502 is dispensed on the sheet of paper 505 (i.e., on the platform 508) via dispenser 512. The wet plaster material can be, e.g., a slurry of gypsum, or another slurry, and can be of a viscosity that is typically used in the formation of plaster boards. A damping precursor sheet 516 is disposed on top of the first layer of plaster 503, for example, by being unrolled from a spool 518 (or multiple spools respectively corresponding to multiple precursor sheets). The position of rollers 520 and 522 may be adjustable to guide the damping precursor sheet(s) 516 into a desired position (e.g., height) with respect to the platform. The dispenser 514 can be used to dispense a second layer of wet plaster material 503 on the damping precursor sheet(s). Finally, a second sheet of paper 510 can be disposed on the second layer of wet plaster material 503. Thus, the wet plaster board precursor 500 includes the body of wet plaster material (i.e., formed from layers 502 and 503, with the damping precursor sheet(s) 416 spread out within the body of wet plaster material (i.e., between layers 502 and 503), desirably at a somewhat constant depth within the body of wet plaster material. The dispense ratio between the dispensers 512 and 514 can be used to control the position of the layer within the board. For example, the ratio of dispense rates can in certain embodiments range from 1:3-3:1, e.g., 1:2-2:1 or 1:1.5-1.5:1. The wet plaster board precursor has sheets of paper 505 and 510 disposed on the first and second surfaces thereof. The process can be run continuously, like conventional gypsum wallboard manufacturing processes. The continuous sheet of plaster board can be divided as is conventional in the art, although extra care or processes may be necessary to cut the material of the damping sheet.

As the person of ordinary skill in the art will appreciate, the above-described process is especially suited for making plaster boards in which the damping sheet extends to two opposing edges of the plasterboard (i.e., in the direction of the continuous process). The damping sheet, however, need not extend to the other two opposing edges (i.e., of a rectangular board), as the width of the damping sheet can be selected to be narrower than the width of the body of wet plaster material.

As noted above, in some examples, each of the continuous layers or precursors thereof can be made up of a carrier sheet with a polymer precursor disposed on the carrier sheet. The polymer precursor may be sprayed onto the carrier sheet prior to forming the wet plaster board precursor. In other examples, the polymer precursor polymer may be impregnated into the carrier sheet prior to forming the wet plaster board precursor. The polymer precursor may be in colloidal or particulate form, for example. In another example, the polymer precursor may take the form of a body of polymer in which the carrier sheet is substantially embedded, or against which the carrier sheet is substantially affixed. For example, a liquid or semiliquid thermally-curable formulation, such as GreenGlue, Weber Glue, or a heat-curable silicone or acrylic, can be applied to a carrier sheet before it is disposed in the body of wet plaster material. Such a formulation can be cured by the heat generated during the hardening of the plaster (which can be, e.g., about 100° C. for about ½ hour). In other embodiments, a damping polymer is applied to the carrier material, e.g., as a powder or dispersion (e.g., polyvinyl butyral powder or Shark Dispersion). In such embodiments, the damping polymer can be softened or even melted by the heat generated during the hardening of the plaster, to form a substantially continuous polymer material and to allow for intimate contact with the hardened plaster material. In certain embodiments, the damping polymer is provided as a substantially continuous sheet, in which the carrier sheet is embedded or to which the carrier sheet is affixed. In such embodiments, the damping polymer can be softened or even melted by the heat generated during the hardening of the plaster, to allow for intimate contact and strong adhesion with the hardened plaster material for better product quality.

In another embodiment, instead of applying the continuous layer or a precursor thereof in sheet form (e.g., either as a carrier sheet with polymer material or precursor disposed thereon, or as a sheet of material such as polymer, fabric or metal), a precursor for the continuous layer can be applied to the surface of the first layer of wet plaster material in liquid or semisolid form, e.g., by spraying or otherwise dispensing a layer of a polymer precursor thereon. A second layer of wet plaster material can be disposed thereon. The polymer precursor can be cured before, after, or during the application of the second layer of wet plaster material. For example, the polymer precursor can be cured at least in part with the heat generated by the drying of the wet plaster material.

At block 404 of FIG. 4, the method 400 includes drying the wet plaster board precursor such that the wet plaster material hardens into the body of hardened plaster. For example, the wet plaster board precursor may be allowed to harden to form the body of hardened plaster material 106 of the plaster board 100 of FIG. 1 or the body of hardened plaster material 206 of the plaster board 200 of FIG. 2. The wet plaster material can be heated (e.g., via an oven or a radiant heater) and/or generate its own heat via an exothermic reaction. As described above, the heat may soften a viscoelastic polymer that is predisposed on the carrier sheet(s) to facilitate bonding the body of hardened plaster material to the damping sheet and/or to facilitate bonding the body of hardened plaster material to the damping sheets. Additionally, the heat may cure a heat-curable formulation to provide the damping polymer; such a cured polymer may also be softened to facilitate bonding. And the heat applied or generated during the drying process is desirably sufficient to cure and harden the body of wet plaster material to form the body of hardened plaster material as described above. The damping polymer may thus form a substantially continuous, uniform layer within or on each of the damping precursor sheet(s) 416 as a result of such heating and/or drying. Accordingly, during the hardening process, the wet plaster board is desirably at a temperature in excess of 70° C. for at least 20 minutes. If the heat formed by the hardening of the plaster material is insufficient, heat can be applied as described above. For example, the wet plaster board precursor can be at a temperature between 70° C. and 130° C. for a duration of at least 20 minutes. The heat may be generated via a heater and/or via an exothermic reaction occurring within the wet plaster board precursor 400.

Drying the wet plaster board precursor may further involve bonding, via the damping material (e.g., the damping polymer itself and/or its precursor), the body of hardened plaster at the first side of each of the one or more damping precursor sheets to the body of hardened plaster at the second side of each of the one or more damping precursor sheets. During drying, the damping polymer that is disposed on the carrier sheet(s) in either its precursor or its final form, may be used to bond the body of hardened plaster material 106 in the embodiment of FIG. 1 at side 110 to the body of hardened plaster material 106 at side 112. Similarly, the viscoelastic polymer that is disposed on the carrier sheet(s) in either its precursor or its final form, may be used to bond the body of hardened plaster material 306 of the embodiment of FIG. 3 at sides 310A, 310B, and 310C to the body of hardened plaster material 206 at respective sides 312A, 312B, and 312C.

Figure 6:
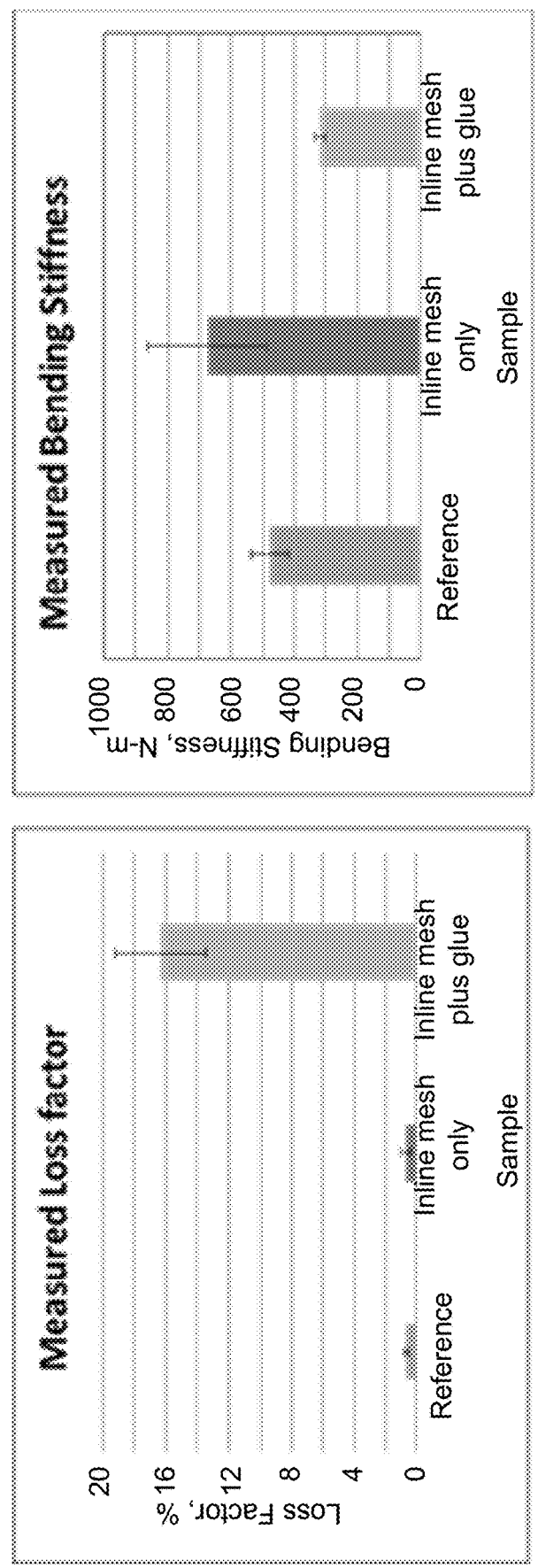
FIG. 6 is a set of graphs of loss factor and bending stiffness of a plaster board of the disclosure as compared to other plaster boards.

FIG. 6 shows experimental data reflecting the damping loss factor and stiffness of various plaster boards. The graph on the left titled "Measured Loss Factor" depicts the damping loss factor of a conventional plaster board (Reference), a plaster board that includes a layer of fiberglass disposed within the plaster board (Inline Mesh Only), and a plaster board similar to the plaster boards 100 and 200 (Inline Mesh+Glue). These were generally made as follows: Gypsum slurry is prepared according to standard techniques, and poured into a mold of given depth to form the first layer of gypsum. A viscoelastic glue applied on a non-woven glass-mat is then put on top of the first layer of wet gypsum. More gypsum slurry is then poured on top the glassmat in the same mold to form a second layer of wet gypsum, to provide final thickness about ⅝". The gypsum in the mold is then dried according to conventional gypsum drying conditions, i.e., temperature, rate of temperature and humidity control, to form a finished board. Properties of the damping board are then measured according to ISO 16940. The graph shows a damping loss factor of about 0.5% for both the conventional plaster board and the plaster board having a fiberglass interior layer. The plaster board similar to the plaster boards 100 and 200 shows a higher damping loss factor of about 16%.

The graph on the right titled "Measured Bending Stiffness" depicts the stiffness or rigidity of the same three plaster boards. The graph shows a stiffness of about 475 newton-meters (Nm) for the conventional plaster board (Reference), a stiffness of about 675 Nm for the plaster board having a fiberglass interior layer (Inline Mesh Only), and a stiffness of about 300 Nm for the plaster board that is similar to the plaster boards 100 and 120 (Inline Mesh+Glue). As shown, adding a fiberglass interior layer to a plaster board without adding a viscoelastic polymer damping material (e.g., viscoelastic glue) does not significantly change the damping loss factor of the plaster board but it can increase the stiffness of the plaster board. The addition of the viscoelastic polymer to the plaster board can increase the damping loss factor of the plaster board and reduce the stiffness of the plaster board.

Figure 7:
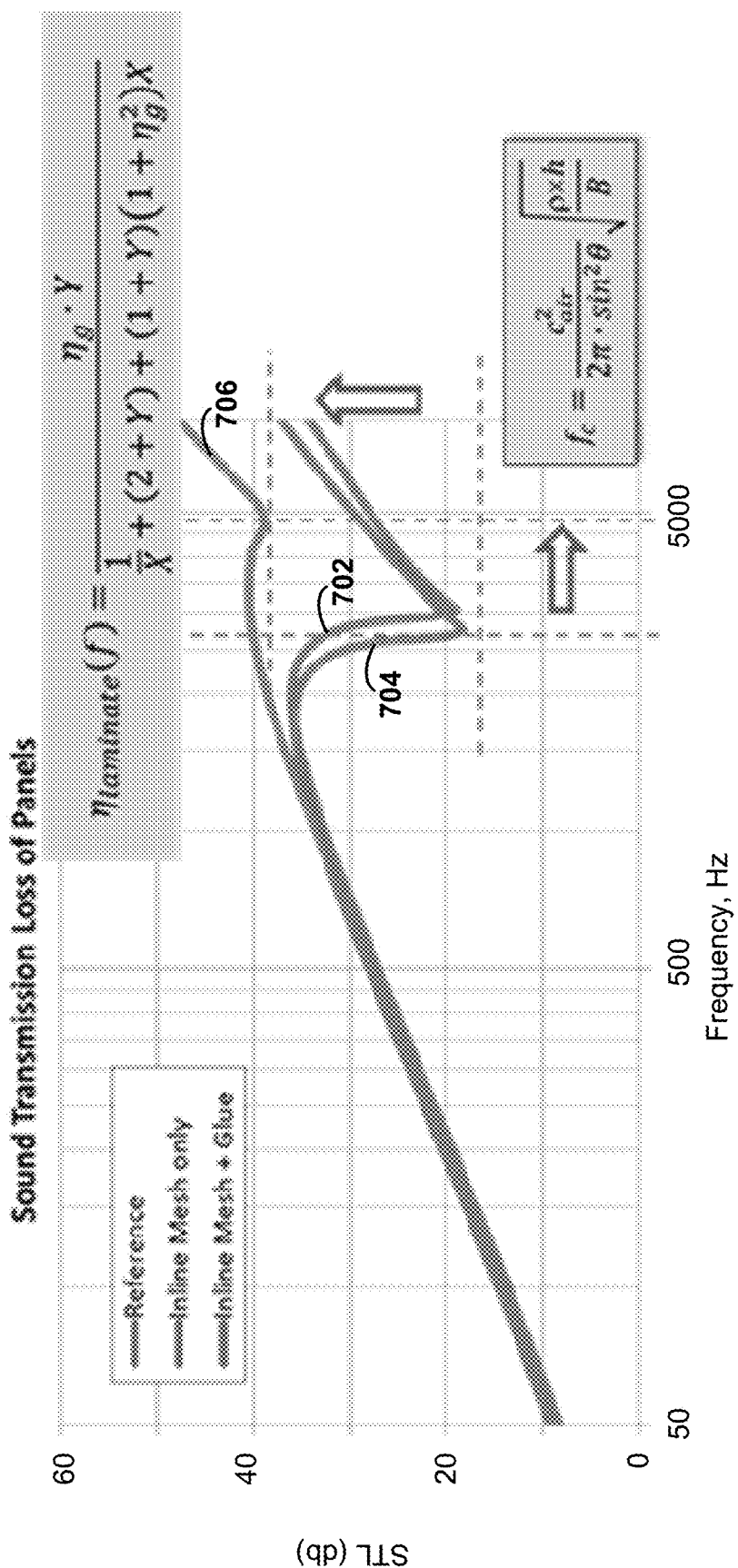
FIG. 7 is a set of sound transmission loss curves for the plaster boards of FIG. 6.

FIG. 7 shows sound transmission loss (STL) curves for the plaster boards discussed above with reference to FIG. 6. The curve 702 corresponds to the conventional plaster board (Reference), the curve 604 corresponds to the plaster board having a fiberglass interior layer (Inline Mesh Only), and the curve 706 corresponds to the plaster board that is similar to the plaster boards 100 and 120 (Inline Mesh+Glue). The curves are calculated based on the properties of the plaster boards experimentally determined and shown in FIG. 6. The curve 702 has an STL corner frequency of about 2.8 kHz. At the corner frequency, the curve 702 has a value of about 18 dB. The curve 604 has an STL corner frequency of about 3 kHz. At the corner frequency, the curve 704 has a value of about 19 dB. The curve 606, on the other hand, exhibits a higher corner frequency of about 5 kHz and a corresponding local minimum STL of about 38 dB. This shows that plaster boards similar to plaster boards 100 and 200, when compared to conventional plaster boards, may be expected to beneficially exhibit higher STL corner frequencies and a lower drop off in STL at the corner frequency.

Figure 8:
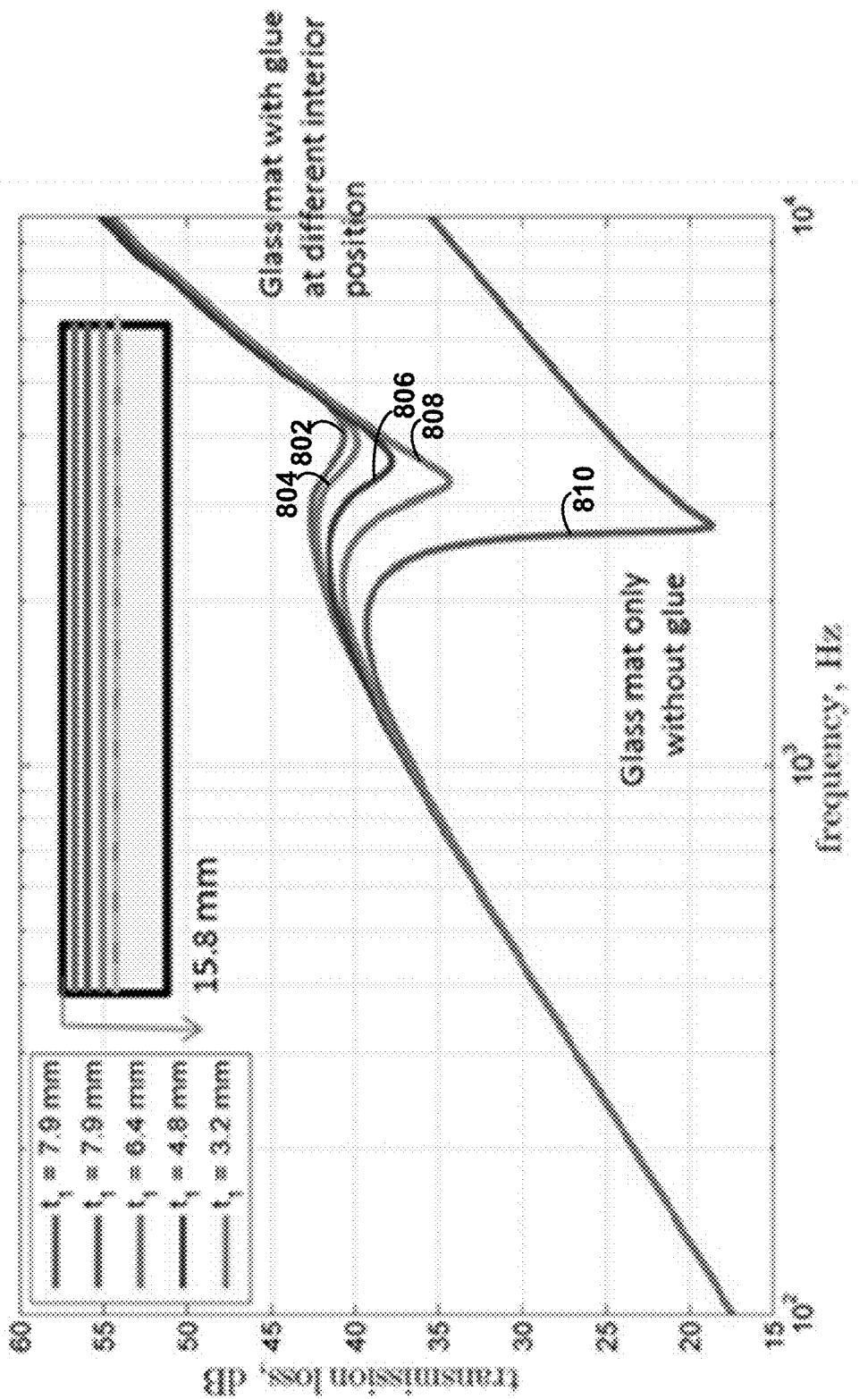
FIG. 8 is a set of curves resulting from a simulation of varying the position of a damping sheet within a plaster board.

FIG. 8 shows a simulation of how varying the position of a fiberglass mat and/or a low-damping sheet within a plaster board may impact the sound damping characteristics of a plaster board having a thickness of approximately 15.8 mm. The curve 802 represents a plaster board having a fiberglass interior layer and viscoelastic damping layer disposed at a depth of 7.9 mm within the plaster board. The curve 804 represents a plaster board having a fiberglass interior layer and viscoelastic damping layer disposed at a depth of 6.4 mm within the plaster board. The curve 806 represents a plaster board having a fiberglass interior layer and viscoelastic damping layer disposed at a depth of 4.8 mm within the plaster board. The curve 808 represents a plaster board having a fiberglass interior layer and viscoelastic damping layer disposed at a depth of 3.2 mm within the plaster board.

As shown by the curves 802-808, placing the fiberglass interior layer and the viscoelastic material closer to the center of the plaster board yields a higher STL corner frequency and a smaller degree of STL drop off at the corner frequency. The curve 810 shows that a plaster board having the interior fiberglass layer without an additional viscoelastic damping material will have a much steeper STL drop off at an even lower corner frequency. The simulation shows that the fiberglass mat can be offset from the center location to some degree while still providing acoustic benefits. This implies that the position of the fiberglass mat and/or the damping layer within the plaster board need not be controlled within the strictest of limits.

Figure 9:
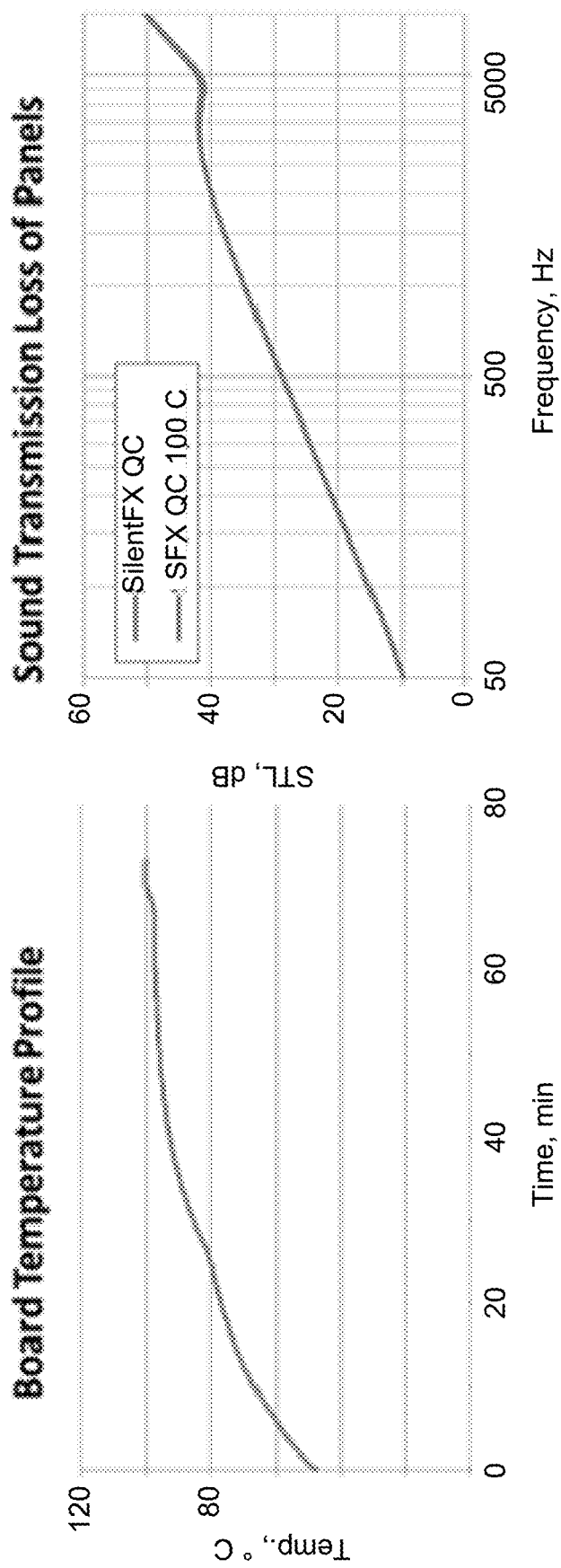
FIG. 9 is a set of graphs of a board temperature profile during curing and the sound transmission loss of plaster boards upon heating.

The left portion of FIG. 9 depicts an example temperature profile of the drying process of block 404 of FIG. 4. The right portion of FIG. 9 shows that a viscoelastic polymer (e.g., a viscoelastic glue) may maintain its acoustic effectiveness after being subjected to the temperature profile shown in the left-hand portion of FIG. 9. That is, the STL curves of plasterboards before and after curing of the viscoelastic glue depict little change in the STL characteristics of the plaster board.

Figure 10:
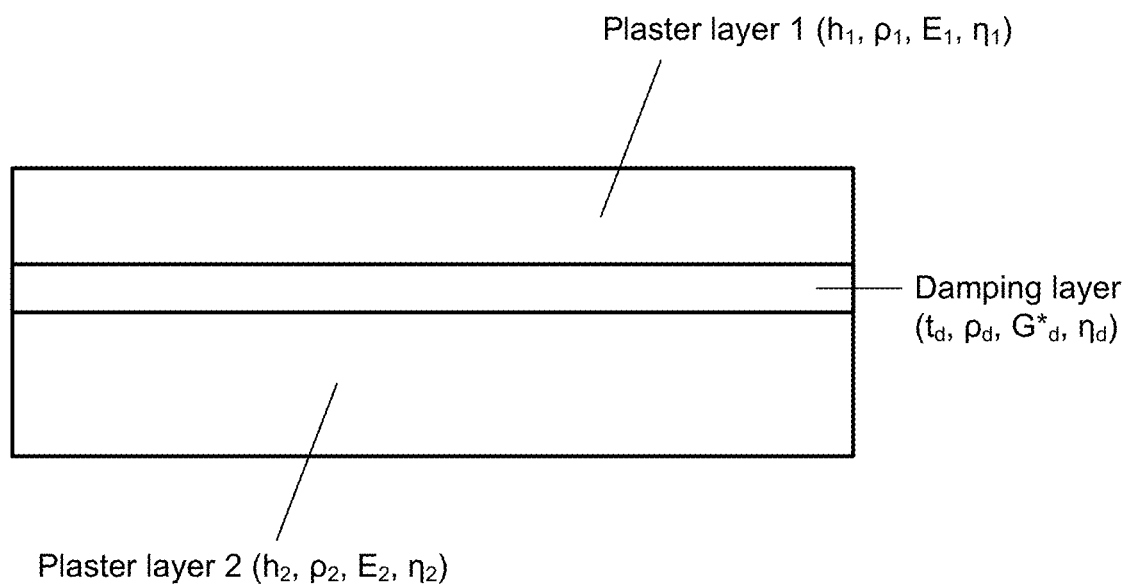
FIG. 10 is a schematic cross-sectional view of a model of a plaster board useful in modelling of constrained layer damping.

As described above, the person of ordinary skill in the art can select various material properties to provide, for example, a desired level of damping. In certain embodiments, the plaster boards described herein can be modeled using principles of constrained layer damping, assuming a viscoelastic damping layer (having a thickness t, a density $\rho$, a shear modulus $G^*$ and a damping loss factor $\eta$) constrained between two layers of plaster (which need not identical in properties, each having a thickness h, a density $\rho$, a Young's modulus E, and a damping loss factor $\eta$). Such a plaster board model is shown in schematic cross-sectional view in FIG. 10. The intermediate damping layer can have much lower rigidity compared to the plaster layers on either side thereof, with a low shear modulus ($G^*$) and high damping loss factor ($\eta$). The damping layer can provide shear deformation when the plaster board undergoes flexural vibration, effectively reducing the rigidity of the structure and providing shear damping, which can lead to improved performance in the so-called "coincidence frequency" range between 2~4 kHz.

The design principles for such a structure is described by the RKU model, described in D. Ross, E. E. Ungar and E. M. Kerwin, "Damping of plate flexural vibrations by means of viscoelastic laminate" Structural Damping, Section II ASME, 1959, which is hereby incorporated herein by reference in its entirety. U.S. Pat. No. 7,745,005, which is hereby incorporated herein by reference in its entirety, also describes the laminated gypsum structure with different patterns of damping layers.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A method for making a plaster board having a first surface and an opposed second surface the plaster board comprising
    a body of hardened plaster material extending from the first surface of the plaster board to the second surface of the plaster board, and
    one or more continuous layers of material disposed within the body and extending along a first axis to two opposed edges of the plaster board, each continuous layer of material having a first side and an opposed second side, the first side and second side of each continuous layer of material being covered by and in contact with the hardened plaster material, each continuous layer being a damping sheet having a damping loss factor that is greater than a damping loss factor of the hardened plaster material, the damping sheet comprising a viscoelastic polymer and having a damping loss factor of at least 5%, the method comprising:
    providing a wet plaster board precursor having a first surface and an opposed second surface, the wet plaster board precursor comprising:
        a body of wet plaster material extending from the first surface of the wet plaster board precursor to the second surface of the wet plaster board precursor; and
        one or more precursors of the continuous layers of material disposed within the body of wet plaster material, each precursor of the continuous layer of material being a damping precursor sheet comprising a carrier sheet and a thermally-curable formulation disposed thereon, each continuous layer of material or precursor therefor having a first side and an opposed second side, the first side and the second side of each continuous layer of material or precursor therefor being covered by and in contact with the wet plaster material; and
    drying the wet plaster board precursor such that the wet plaster material hardens into the body of hardened plaster material, and such that heat provided during the hardening of the plaster material cures the thermally-curable formulation to form to the viscoelastic polymer, thereby forming the continuous layer of material within the body of hardened plaster material.

2. The method of claim 1, wherein the plaster material comprises a base material that is a gypsum material.

3. The method of claim 1, wherein the carrier sheet comprises a fiberglass mat or a fiberglass fabric.

4. The method of claim 1, wherein the carrier sheet comprises a sheet of foamed polymer.

5. The method of claim 1, wherein providing the damping precursor sheet comprises spraying the thermally-curable formulation onto the carrier sheet.

6. The method of claim 1, wherein the damping polymer has a shear modulus in the range of 10 kPa to 100 MPa.

7. The method of claim 1, wherein the damping loss factor for each damping sheet is at least 5%.

8. The method of claim 1, wherein the one or more continuous layers of material are a single continuous layer of material.

9. The method of claim 1, wherein the one or more continuous layers of material are a plurality of continuous layers of material, comprising at least
    a first continuous layer of material that is elongated in parallel with a first axis of the plaster board, and
    a second continuous layer of material that is elongated in parallel with the first axis of the plaster board.

10. The method of claim 1, wherein providing the wet plaster board precursor comprises dispensing the body of wet plaster material onto a conveyer.

11. The method of claim 10, wherein a sheet of backing material is disposed on the conveyor, such that the body of wet plaster material is disposed on the backing material.

12. The method of claim 1, wherein providing the wet plaster board precursor comprises providing a first layer of wet plaster material, providing the one or more continuous layers of material or precursors therefor on the first layer of wet plaster material, and providing a second layer of wet plaster material on the one or more continuous layers of material or precursors therefor.

13. The method of claim 1, wherein the viscoelastic damping polymer has a damping loss factor in the range 5% to 30%.

14. The method of claim 1, wherein the viscoelastic damping polymer has a shear modulus in the range of 100 kPa to 100 mPa.

15. The method of claim 1, wherein each damping sheet is at least 20% less rigid than the body of the hardened plaster material as measured by ASTM E75-05.

16. The method of claim 1, wherein the thermally-curable formulation is a liquid or semiliquid.

17. The method of claim 1, wherein the thermally-cured material is a viscoelastic glue.

18. The method of claim 1, wherein the thermally-curable formulation is selected from GreenGlue, Weber Glue, or a heat-curable silicone or acrylic.

19. The method of claim 1, wherein the heat provided during the hardening of the plaster material is about 100° C.

20. The method of claim 1, wherein the heat provided during the hardening of the plaster material cures the thermally-curable formulation in about half an hour.

* * * * *